Figure 1:
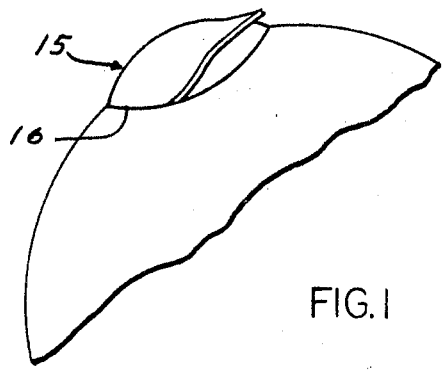

Aug. 5, 1969 W. STONE, JR 3,458,870
ARTIFICIAL CORNEAL IMPLANTS HAVING A REMOVABLE LENS MEMBER
Filed May 25, 1964 3 Sheets-Sheet 1

INVENTOR.
WILLIAM STONE JR.
BY
ATTORNEY

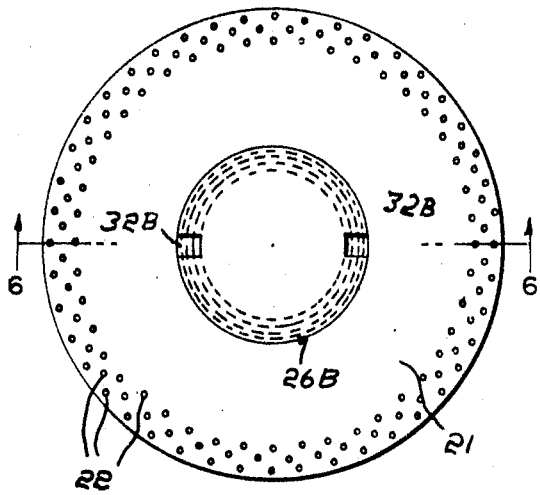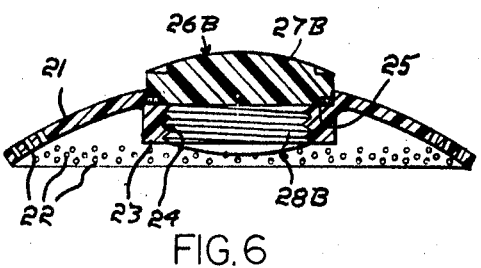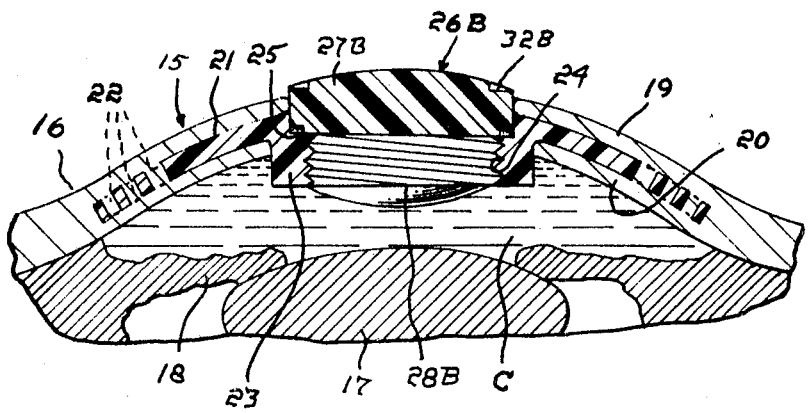

Aug. 5, 1969 W. STONE, JR 3,458,870
ARTIFICIAL CORNEAL IMPLANTS HAVING A REMOVABLE LENS MEMBER
Filed May 25, 1964 3 Sheets-Sheet 3

INVENTOR.
WILLIAM STONE JR.
BY
*Abbott Spear,*
ATTORNEY

United States Patent Office 3,458,870
Patented Aug. 5, 1969

3,458,870
ARTIFICIAL CORNEAL IMPLANTS HAVING A REMOVABLE LENS MEMBER
William Stone, Jr., 478 Commonwealth Ave., Boston Mass. 02115
Filed May 25, 1964, Ser. No. 369,770
Int. Cl. A61f 1/16
U.S. Cl. 3—13    6 Claims The present invention relates to artificial corneal implants, each having a removable lens member.

In my Letters Patent No. 2,714,721, dated Aug. 9, 1955, there are disclosed artificial corneal implants of stock that is inert with respect to corneal stroma and sufficiently clear for optical uses. Each such implant is to be inserted between surgically established anterior and posterior corneal layers, which are then sutured, and the implants have passages through which corneal stroma grows to anchor them permanently in place. After an implant has become thus anchored by the ingrowth of the corneal stroma, the anterior layer and, often, the posterior layer as well are trephined.

Continuing animal experimentation with such implants confirms that such corneal implants can be used safely in surgically correcting corneal opacification in humans. While such experimentation has also established essential surgical techniques, certain problems must be solved before human surgery is attempted not only for the correction of corneal opacification but also in case of certain complications such as those sometimes attendant cataracts, synechia, and reformed membranes.

It must be assumed that a permanently anchored implant will, for one reason or the other, become no longer sufficiently clear for satisfactory use or that it will prove necessary or desirable to have the implant function as a corrective lens that, from time to time, would need to be changed.

Another problem is that of simplifying certain phases of surgery. As stated above, trephining of the posterior layer is often necessary or desirable. This cannot readily be done with an implant in accordance with said patent until it has become anchored by the ingrowth of stroma and it is somewhat difficult for the surgeon to enter the anterior chamber marginally of the implant and trephine the posterior layer.

The principal objective of the present invention is to eliminate the two problems to which reference has been made, an objective attained by providing an implant including a holding member of concavo-convex form having a central opening and marginal passages for the anchoring ingrowth of corneal stroma, and a lens member removably held in the opening. At least the portion of the holding member having the anchoring passages must be of a material that will be tolerated by corneal stroma and the lens member must be of a material that is sufficiently clear for optical purposes. While the holding member and the lens member may be formed from the same material, one of the attributes of the present invention is that they may be formed from different materials. With such an implant, the lens member may be removed and replaced safely and easily and, in addition, by removing the lens member, after the implant has become securely anchored by the ingrowth of stroma, the posterior layer may be trephined through the central opening.

The lens member may be connected to the holding member in various ways provided leakage between them is prevented and an important objective of the parent invention is to provide implants where the mutually engaged surfaces of the members are of such extent that leakage problems are avoided. This objective is attained by providing the holding member with a central portion having a lens receiving opening effecting communication between its anterior and posterior faces, the central portion projecting with respect to either or both of those faces. This construction ensures adequate joint length without the height of the anterior projection being such as to cause discomfort. This feature of the invention is also of importance because trephined corneal layers tend to grow until healing is complete and any encroachment on the lens member must be prevented. Such projecting portions function to prevent such overgrowth whenever it otherwise might occur.

These and other of the objectives, novel features, and advantages of the invention will be apparent from the accompanying drawings which show illustrative embodiments of the invention.

Figure 2:
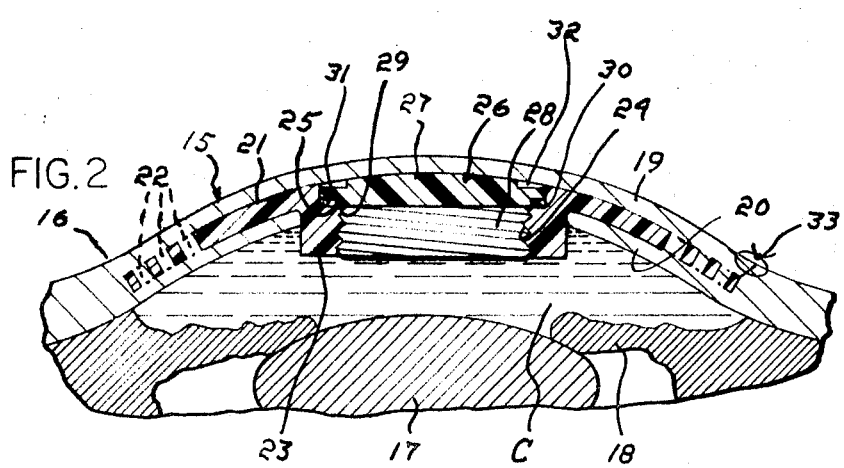
Figure 3:
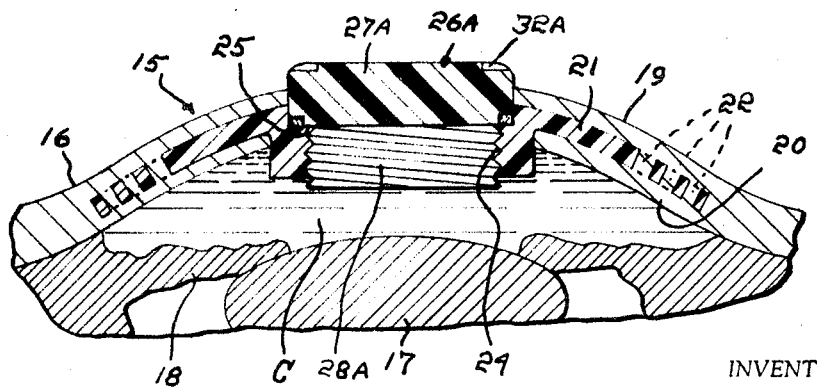
Figure 7:
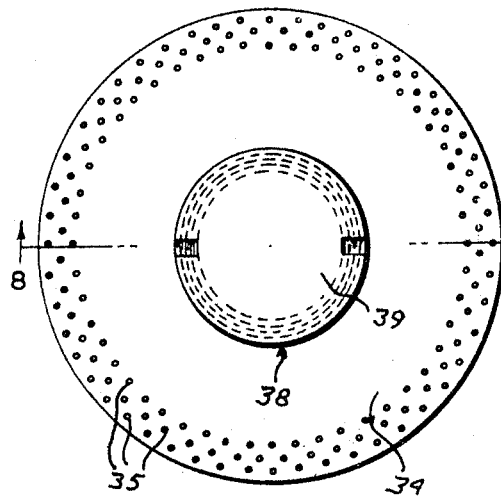
Figure 8:
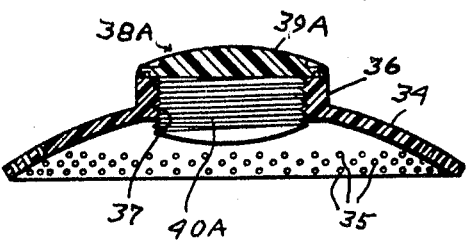
Figure 9:
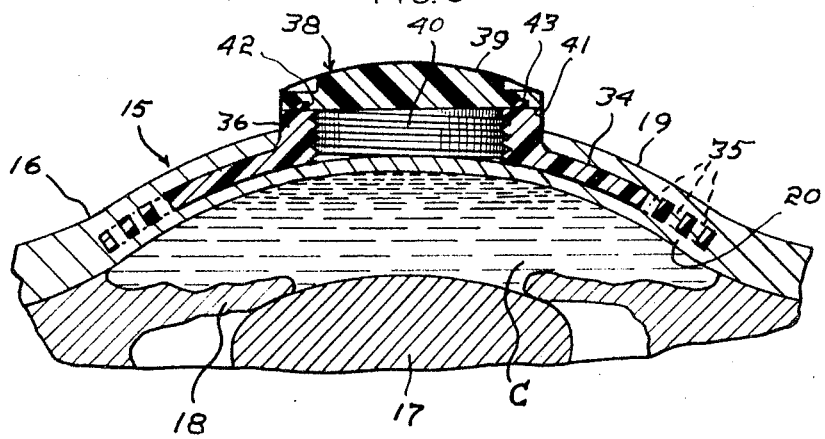
Figure 10:
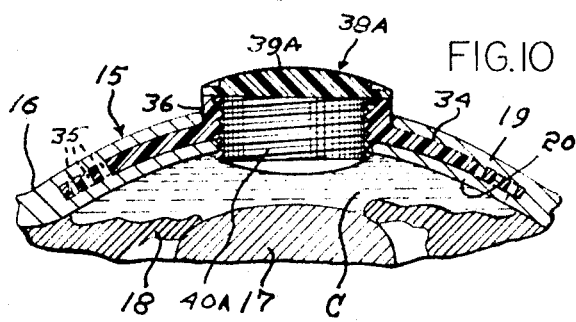

In the drawings:

FIGURE 1 is a perspective, fragmentary view of an eyeball illustrating the division of its cornea into anterior and posterior layers, FIGURE 2 is a fragmentary section, on a substantially increased scale, of the corneal portion of a human eyeball with a corneal implant in accordance with the invention held by the anterior corneal layer, the posterior corneal layer having been trephined, FIGURE 3 is a like section of the corneal portion of a human eyeball with the holding member of the corneal implant anchored by ingrown stroma, the anterior corneal layer having now been trephined and the holding member now removably supporting a temporary member whose primary function is to block the growth of the anterior layer, FIGURE 4 is a like view with the temporary lens member replaced by the permanent lens member, FIGURE 5 is a plan view of the implant, FIGURE 6 is a section taken approximately along the indicated lines 6—6 of FIGURE 5, FIGURE 7 is a plan view of an implant in accordance with another embodiment of the invention, FIGURE 8 is a section taken approximately along the indicated lines 8—8 of FIGURE 7, but with the temporary lens replaced by a permanent lens, FIGURE 9 is a fragmentary section of the corneal portion of a human eyeball with the implant of FIGURE 7 inserted between anterior and posterior corneal layers, the anterior layer having been trephined, and FIGURE 10 is a like view with the posterior corneal layer trephined and the temporary lens member replaced by the permanent lens member.

Reference is first made to FIGURE 1 wherein the cornea of a human eyeball is generally indicated at 15. The cornea 15 protrudes slightly relative to the general contour of the remainder of the eyeball thus establishing the limbus 16. As illustrated by FIGURES 2, 3, 4, 9 and 10, the space between the cornea 15 and the lens 17 and iris 18 is the anterior chamber C containing aqueous humor. In the correction of corneal opacification by means of an artificial corneal implant, the technique is to form a pocket by dividing the cornea 15 into an anterior layer 19 and a posterior layer 20 with the incision being started in the zone of the limbus 16. The pocket is dimensioned to enable the implant to be inserted therein following which insertion the incision is sutured.

In the embodiment of the invention illustrated by FIGURES 2-6, an implant is shown as including a holding member 21 of concavo-convex form and having a multiplicity of marginal holes 22 extending from face-to-face thereof to permit the anchoring ingrowth of stroma. The holding member 21 has a central, inwardly extending portion 23 having an opening 24 extending therethrough, the opening being shown as threaded and as having an annular recess 25 at its anterior end. The portion 23 extends inwardly into the anterior chamber C beyond the trephined posterior layer 20 and provides a leakage-preventing thread length for the lens member such as the lens member generally indicated at 26, shown in FIGURE 2, the lens member 26A in FIGURE 3, or the lens member 26B shown in FIGURES 4–6.

The lens member 26 includes a head 27 and a shank 28 threaded for entry into the opening 24. The surface of the head 27 is convex thus to merge with adjacent portions of the holding member 21 and the head 27 is dimensioned to fit into the recess 25 with its flat undersurface 29 having a marginal recess 30 for a seal 31 conveniently of the O-ring type, and seated by the head 27 against the bottom of the recess 25 when the shank 28 has been fully threaded into the opening 21. It will be noted that the outer surface of the head 27 has marginal recesses 32 for engagement by a tool, not shown, to enable the lens member 26 to be secured in the holding member 21 or detached therefrom.

In FIGURE 2, the anterior layer 19 is sutured as at 33 so that the lens member 26 may be only a temporary lens for use until the holding member 21 has become permanently anchored by the ingrowth of corneal stroma. The posterior layer 20 is shown as trephined and this may have been done during the original operation or later, conveniently through the opening 24. If desired, the anterior layer 19 could be a corneal transplant sutured in place during the original operation.

In FIGURE 3, the holding member 21 has become permanently anchored so that the anterior layer 19 is now trephined, if not done at the time of the original operation. The lens member 26 is now replaced with another substantially identical lens member generally indicated at 26A and whose corresponding parts are indicated by the same reference numerals but with the suffix addition A. The difference between the lens members 26 and 26A is that the head 27A of the latter projects sufficiently to block any growth of the corneal layer 19.

When the trephined margin of the corneal layer 19 heals, the lens member 26A is removed and replaced. The lens 26B is shown as substantially identical to the lens 26 and the reference numerals for its corresponding parts are distinguished by the suffix addition B. The lens 26B may be assumed to be the permanent lens and its differences are that its head 27B projects sufficiently to provide a marginal shoulder and its outer end is a lens surface as is the inner end of its shank 28B.

Reference is now made to FIGURES 7–10 wherein the implant is shown as having a holding member 34 of concavo-convex form and, like the holding member 21, having a multiplicity of marginal holes 35 extending from face-to-face thereof to permit the anchoring ingrowth of corneal stroma. The holding member 34 has a central, outwardly extending portion 36 having an opening 37 extending therethrough. The opening is shown as threaded and by reference to FIGURES 9 and 10, it will be seen that the portion 36 protrudes a sufficient distance relative to the anterior face of the holding member 34 to block the growth of the anterior corneal layer 19 which is shown in FIGURE 9 to be trephined, at the time of the initial operation if desired.

In FIGURE 9, the posterior layer 20 has not been trephined and the implant includes a generally indicated lens member 38 having a head 39 and a shank 40 threaded in the opening 37. The head 39 projects laterally to overlie the anterior end of the portion 36 of the holding member 34 and its overlying face 41 has an annular channel 42 for a seal 43, shown as an O-ring, which is held in sealing relationship between the head and the portion 36.

When the holding member 34 has become permanently anchored by the ingrowth of corneal stroma, the posterior corneal layer 20 may be trephined. This is effected by removing the lens member 38 so that the corneal layer 20 may be trephined through the opening 37. The lens member 38 might be the permanent lens member but is herein regarded as for the temporary use to be replaced by the generally indicated lens member 38A which is substantially identical with the reference numerals indicating corresponding parts being distinguished by the suffix addition A. The physical difference between the lens member 38 and 38A is that the length of the shank 40A is such that it may, if necessary, protrude into the anterior chamber 10 beyond the posterior corneal layer 20.

The holding members must be made of a material that is sufficiently inert to be tolerated by corneal stroma, at least with respect to the portion thereof that is provided with anchoring passages, suitable materials being plastics, glass, and the inert metals. The lens members must be of material that is sufficiently clear for optical purposes and must be inert with respect to aqueous humor as indeed the holding members also must be. Glass or plastics may be used for the lens members. The implants may have their holding members of one material and their lens members of the same or another material. The seals must be inert to aqueous humar.

While the lens members are shown as threaded into the holding member, bayonet joints between or friction fits of the members are but two obvious equivalents.

From the foregoing, it will be apparent that implants in accordance with the invention are well adapted to meet the various problems involved.

I claim:

1. A corneal implant of the type that is adapted to be marginally located between anterior and posterior corneal layers, said implant including a holding member of concavo-convex form having a central opening extending therethrough and provided with an outwardly exposed shoulder between its ends and a plurality of passages adjacent its periphery through which corneal stroma may grow and by such growing permanently anchor the implant, a lens member removably held in said opening and including a head marginally overlying said opening and a seal seated by said shoulder against said holding member, each member being of a material inert with respect to aqueous humor, at least the portion of the holding member provided with anchoring passages being sufficiently inert to be tolerated by corneal stroma, and the lens member being sufficiently clear for optical purposes.

2. A corneal implant of the type that is adapted to be marginally located between anterior and posterior corneal layers, said implant including a holding member of concavo-convex form having a central opening extending therethrough and a plurality of passages adjacent its periphery through which corneal stroma may grow and by such growing permanently anchor the implant, said opening having a recess to provide a shoulder, a lens member removably held in said opening and including a head providing a marginal shoulder fitting said recess, and a seal held between said shoulders, each member being of a material inert with respect to aqueous humor, at least the portion of the holding member provided with anchoring passages being sufficiently inert to be tolerated by corneal stroma, and the lens member being sufficiently clear for optical purposes.

3. A corneal implant of the type that is adapted to be marginally located between anterior and posterior corneal layers, said implant including a holding member of concavo-convex form having a central inwardly protruding portion having an opening effecting communication between its anterior and posterior ends and a plurality of passages adjacent its periphery through which corneal stroma may grow and by such growing permanently anchor the implant, the anterior end of said opening being recessed to provide a seat, and a lens member removably held in said opening and including a head entrant of said seat, the anterior surface of said head being convex and merging with the proximate margin of said holding member, each member being of a material inert with respect to aqueous humor, at least the portion of the holding member provided with anchoring passages being sufficiently inert to be tolerated by corneal stroma, and the lens member being sufficiently clear for optical purposes.

4. A corneal implant of the type that is adapted to be marginally located between anterior and posterior corneal layers, said implant including a holding member of concavo-convex form having a central opening effecting communication between its anterior and posterior ends and a plurality of passages adjacent its periphery through which corneal stroma may grow and by such growing permanently anchor the implant, and a lens member removably held in said opening and including a head overlying the holding member marginally of said opening, the overlying margin of the head including portions engageable by a tool for removing said lens member, each member being of a material inert with respect to aqueous humor, at least the portion of the holding member provided with anchoring passages being sufficiently inert to be tolerated by corneal stroma, and the lens member being sufficiently clear for optical purposes.

5. The implant of claim 4 in which the opening of the holding member and the lens member include interengageable portions engaged and released by turning the lens member relative to the holding member in one direction or the other.

6. A corneal implant of the type that is adapted to be marginally located between anterior and posterior corneal layers, said implant including a holding member of concavo-convex form having an opening extending therethrough and a plurality of passages adjacent its periphery through which corneal stroma may grow and by such growing permanently anchor the implant, and a lens member removably held in said opening and including a head overlying the holding member marginally of said opening, one of said members having in the zone where said members overlap, portions engageable by a tool for removing said lens member, each member being of a material inert with respect to aqueous humor, at least the portion of the holding member provided with anchoring passages being sufficiently inert to be tolerated by corneal stroma, and the lens member being sufficiently clear for optical purposes.

References Cited

UNITED STATES PATENTS

| 2,714,721 | 8/1955 | Stone | 3—1 |
| 3,074,407 | 1/1963 | Moon et al. | 128—303 |

OTHER REFERENCES

H. Cardona, "Keratoprosthesis," American Journal of Ophthalmology, vol. 54, No. 2, pp. 284–294, August 1962.

M. A. Torres et al., "Implantation of an Artificial Cornea," American Journal of Opthalmology, vol. 56, No. 6 pp. 937–941, December 1963.

RICHARD A. GAUDET, Primary Examiner

RONALD L. FRINKS, Assistant Examiner